Nov. 11, 1969    G. H. RICKENBRODE    3,477,341
PORTABLE MACHINE
Filed May 25, 1967    2 Sheets-Sheet 1

INVENTOR.
Gary H. Rickenbrode
BY
*Maguire*
ATTORNEY

United States Patent Office 3,477,341
Patented Nov. 11, 1969

3,477,341
PORTABLE MACHINE
Gary H. Rickenbrode, Wadsworth, Ohio, assignor to The Babcock & Wilcox Company, New York, N.Y., a corporation of New Jersey
Filed May 25, 1967, Ser. No. 641,273
Int. Cl. B23c 1/20, 1/16, 1/18
U.S. Cl. 90—12                               10 Claims

ABSTRACT OF THE DISCLOSURE

A portable machine for facing a workpiece surface including a frame to which there is pivoted an arm having a free end rollably supported by the workpiece, the arm having a movable machine head mounted thereon that is movable by a tracer unit operably connected to trace a template mounted on the workpiece so that the workpiece surface is faced in correspondence with the template surface.

BACKGROUND AND SUMMARY OF THE INVENTION

Stationary machines are used to perform machining operations on movable workpieces, whereas portable machines are used to perform like machining operations on stationary workpieces. Machines are either made stationary or portable depending, for example, on the time required to perform the machining operation, the amount of metal being removed from the workpiece, the physical dimensions of the machine tool and/or workpiece, and the weight of machine tool and/or workpiece.

Conventional stationary machines require a foundation that is large enough to both continuously support the machine tool and temporarily support the workpiece, whereas the conventional portable machine is continuously supported on its own foundation apart from the workpiece. To bridge the utility gap between the conventional machines, industry has devised a so-called "satellite" machine which is characterized in that it is attachable to the workpiece and supported in place thereby during the machining operation. In essence, the satellite machine is a special type of portable machine distinguishable over the conventional type in that it temporarily utilizes the workpiece as a supporting foundation during the machining operation. When using a satellite machine, the workpiece may be moved or mounted on either a stationary or movable foundation during the machining operation without disturbing the relationship between the workpiece and machine tool.

The inventors have recently been confronted with the problem of tooling for on-site assembly of pressure vessels up to 30 feet in diameter and 150 feet in length which weigh approximately 1,000 tons. Off-the-shelf conventional machines and satellite machines were found to be lacking in versatility and inadequate for many operations. The instant disclosure relates to a satellite-type machine adapted to perform precision machining operations on such grossly-proportioned workpieces in the field. More particularly, the disclosure relates to a satellite-type portable machine for machining a surface on a nuclear reactor pressure vessel comprising a frame for supporting the machine head on the workpiece, an arm pivotally supported by the frame and having a free end rollably supported by the workpiece, a machine head movably mounted on the arm and adapted to drive an incising tool, a template mounted on the workpiece and having a surface corresponding to the surface on the workpiece after facing, tracer means operably associated with the machine head and template for moving the machine head to face the workpiece surface in correspondence with the template surface, and means for moving the arm during the facing operation.

DESCRIPTION OF THE PREFERRED EMBODIMENT

Figure 1:
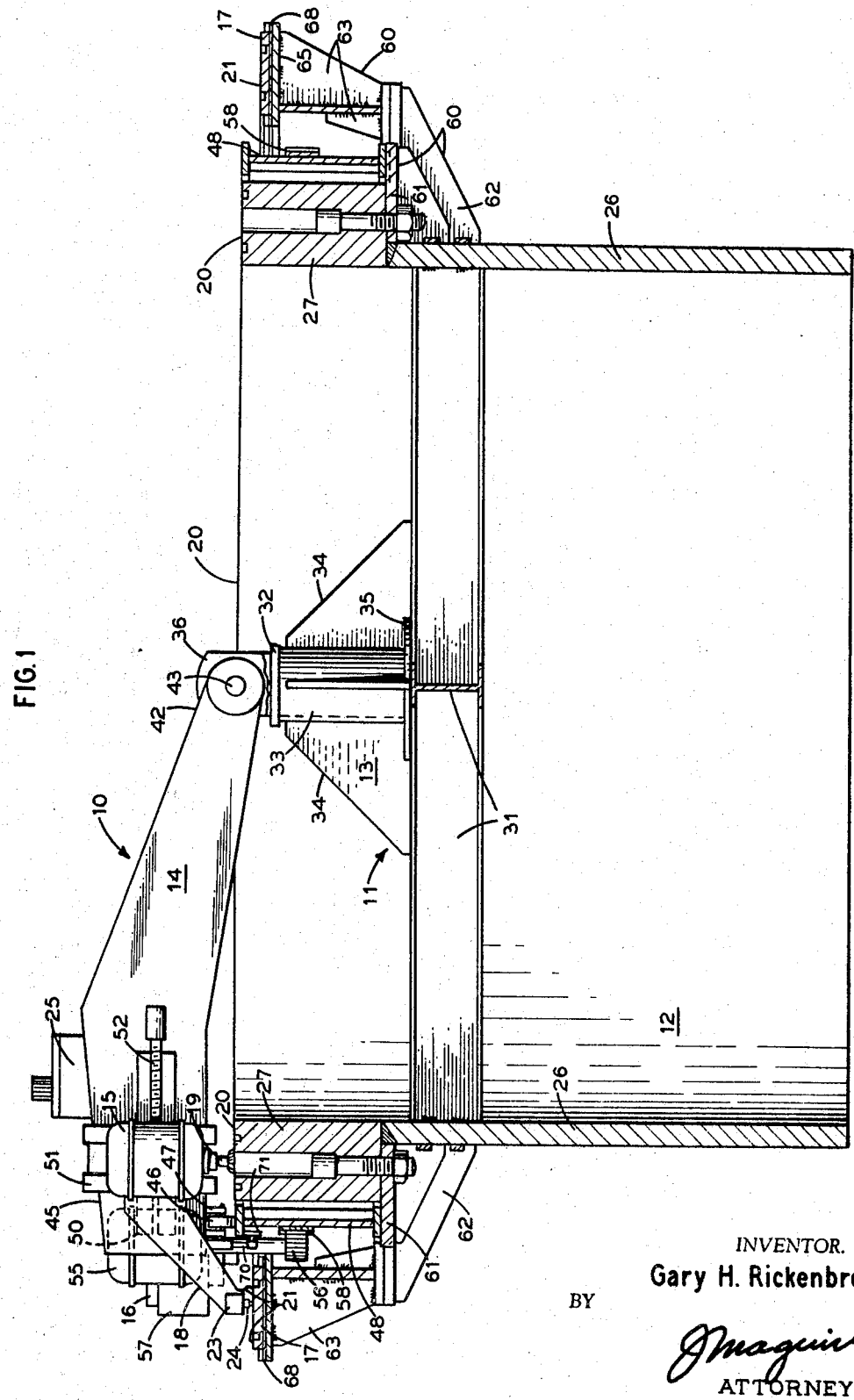
FIG. 1 is a side view of the inventive device.
Figure 2:
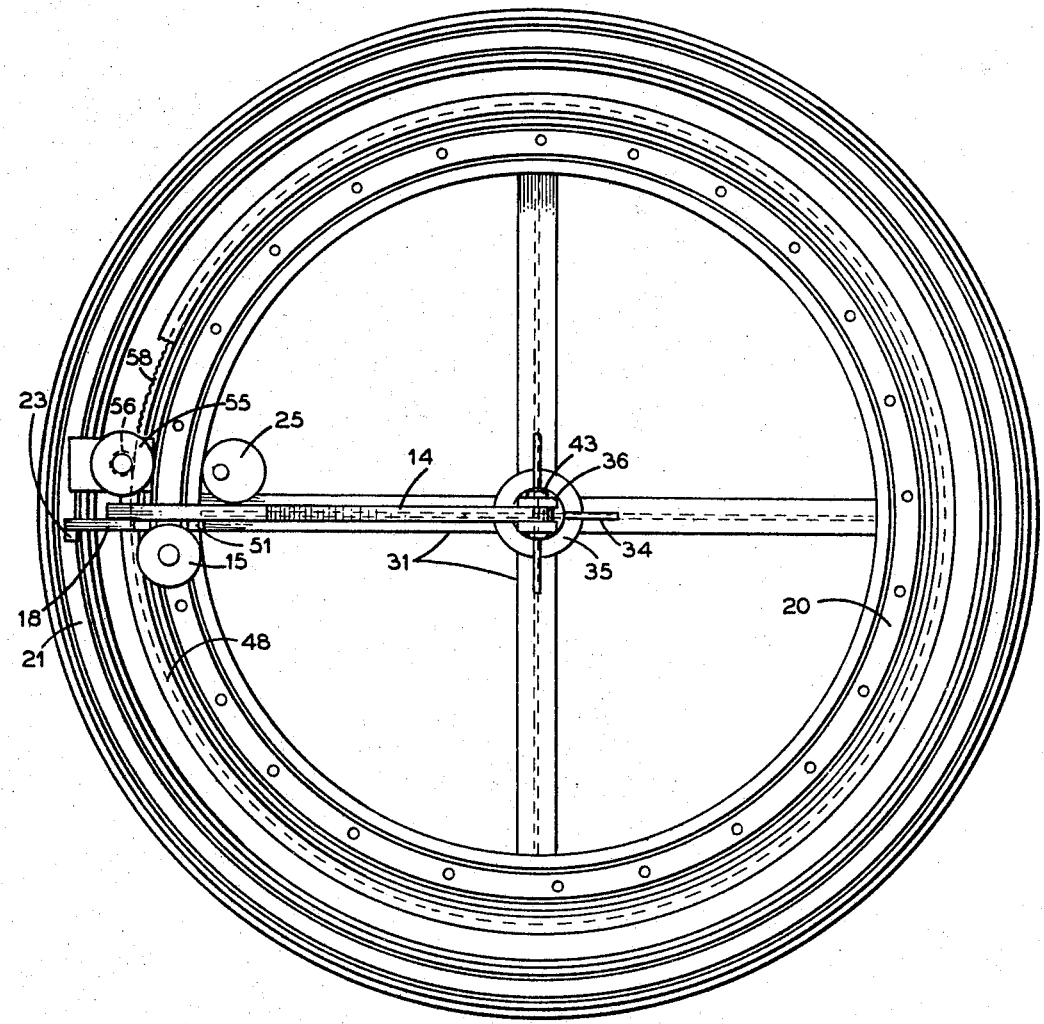
FIG. 2 is a top view of the inventive device.

Referring now to the drawings wherein like reference characters designate like or corresponding parts throughout the several views there is shown in FIG. 1 a satellite-type portable facing machine 10 adapted to be connected to a workpiece 12 to be faced. The machine 10 generally comprises a frame 11 for mounting the machine 10 on the workpiece 12, the frame 11 including a pedestal 13 provided for supporting an arm 14 pivoted thereto. The arm 14 overhangs the frame 11, is rotatable about the pedestal 13, and is adapted to carry a machine head 15 connected thereto for movement relative to the workpiece 12. The arm 14 further carries a motorized feed mechanism 16 depending therefrom and operably connected to the workpiece 12 for moving the arm substantially parallel to the surface 20 of the workpiece 12 to be faced. A template 17 provided with a contoured surface 21 corresponding to the contour of the finished face, is mounted on the workpiece adjacent the surface 20 to be faced. A leg 18 depending from the machine head 15 carries a tracer valve assembly 23 having a valve 24 arranged to track the surface 21 of the template 17. The arm 14 also carries a hydraulically actuated tracer unit 25, operably interconnected intermediate the tracer valve 24 and machine head 15, by means well known in the art, for converting tracer valve motion to machine head motion. The machine head 15, which is adapted to drive incising tools 19 well known in the art, traces the movement of the valve 24, carrying the tool 19 toward and away from the workpiece 12 for incising the surface 20 thereon.

As shown in FIG. 1 the frame 11 includes a beam structure 31 removably welded or frictionably held in place on the workpiece 12 for supporting the pedestal 13 centrally thereof. In practice, the workpiece is a cylindrical nuclear reactor shell 26 terminated at the upper end by an annular flange 27 having a mating surface 20 to be faced.

The pedestal 13 is a structural member disposed centrally of the beam 31, welded in place thereon and axially bored to receive a bearing bushing 32. The pedestal 13 comprises a cylindrical member 33 vertically supported by a plurality of triangularly shaped elements 34 radially extending from the member 33 and connected to a disc 35 mounted on the frame 11. The bearing bushing 32 is mounted within the cylindrical member 33 by means well known in the art.

A pivot shaft 36, journalled for rotation in the bearing bushing 32, is restrained to prevent endwise movement therein during the facing operation. It is seen that the shaft 36 extends vertically above the pedestal 13 for connection to the arm 14 and is mounted for 360° rotation within the bushing 32.

The arm 14 is an elongated member having an inner end 42 and an outer end 45. The inner end 42 is supported on a pivot pin 43 mounted transversely through the upper end of the shaft 36 for rotation of the arm thereabout in a substantially vertical plane. The outer end 45 is supported on a roller 46 carried by a forked member 47 depending from the arm. A platform 48 comprising a structural member encircling the workpiece and supported in place thereby acts as a raceway for the roller 46, allowing the outer end 45 of the arm 14 to be moved in a substantially horizontal plane about the pedestal 13 on the pivot shaft 36.

Since the arm is supported at both its inner and outer ends as a bridge, the arm is less subject to vibration when the machine is being used than prior art devices that are solely supported centrally of the frame as a cantilever. Further, the arrangement eliminates the necessity for having as heavy a pedestal 13 as is required for cantilever arrangements, thus allowing for a less bulky frame 11 than would be needed for supporting the pedestal of a cantilevered arm. Inasmuch as portability of the inventive device is of prime importance this consideration is of great significance.

The outer end 45 of the arm is provided with horizontal 50 and vertical 51 guide ways cooperatively associated for slidably mounting the machine head 15 on the arm 14. A rotatably operated feed screw 52 operably associated with the machine head and horizontal guide way 50 is provided for horizontal positioning of the machine head over the surface 20 to be faced.

The motorized feed mechanism 16 includes a drive motor 55 mounted upon the arm 14 adjacent the roller 46 for driving a sprocket gear 56 through a gear box 57. A chain 58 having a longitudinal configuration complementary to the sprocket gear 56 for continuous engagement therewith, is wrapped around the base of the platform 48 and anchored in place thereon to provide a circular rack for the drive sprocket gear 56. As the drive gear rotates the arm 14 is rotated about the workpiece in a substantially horizontal plane. In practice, the chain 58 is connected to the base of the platform by lugs (not shown) welded thereto. As is well known in the art, the chain 58 is composed of a plurality of links endwise interconnected to one another by pivot pins. At regular intervals, these pins may be made longer for engagement with the lugs welded to the platform base for supporting the chain in place. It is understood, of course, that other driving arrangements, for example a spur and ring gear arrangement, may be substituted for the sprocket and chain arrangement without departing from the spirit and scope of the invention.

In the preferred embodiment, the template 17 and platform 48 are mounted on the workpiece by means of a plurality of support members 60 connected thereon in the field. The support members 60 include an annular support plate 61 removably bolted to the underside of the flange 27, a plurality of support brackets 62 spaced at regular intervals, around the reactor shell 26 and mounted beneath the plate 61, and an annularly spaced template support 63 mounted on the ends of the brackets 62 at the periphery of the plate 61 remote from reactor flange.

It is seen that the support plate 61 extends outwardly from the flange for mounting the raceway platform 48 substantially upright and intermediate the support 63 and flange 27; the support brackets 62 have one end connected to the reactor shell 26 and the other end connected to the underside of the outer periphery of the plate 61 for rigidly supporting the plate 61 in a substantially horizontal plane and for anchoring the template support 63 in place on the brackets 62; the drive sprocket 56 extends downwardly between the template support 63 and platform 48 for engagement with the chain 58; and the template support is provided with an upper end 65 disposed in a plane substantially parallel to the surface of the flange to be faced so that the template 17 when mounted thereon may be adjusted in place by means of shims 68 as is well known in the art.

As shown in FIG. 1 the outer end of the arm is provided with a hanger bar 70 pivoted to the underside of the arm 14 adjacent the roller 46 for carrying a second roller 71 that bears upwardly against the platform 48. In practice, the outer end of the arm may be lifted upwardly and pivoted about the shaft 36 when the hanger 70 is pivoted toward the arm 14. However, during the facing operation the hanger 70 is secured in the vertical position shown in FIGURE 1 to restrain for motion in a substantially horizontal plane.

In operation, the template contour is sensed by the tracing valve which actuates the power unit for raising and lowering the machine head 15 so that the flange is faced to the same contour as the template. The tracer valve 23 senses variation in surface configuration vis-a-vis the template and platform for moving the machine head 15 so the incising tool faces the workpiece surface in correspondence to the template surface.

It is a feature of the invention to provide an expandable beam structure 31 together with an expandable arm structure 14 to adapt the machine 10 for facing a plurality of workpieces 12 having greater and/or lesser dimensions.

It is understood of course that it is a feature of the invention to provide a hydraulically actuated tracing unit and a further feature to provide other types of well known tracer units similarly capable of automatically controlling the position of the machine head during machining operations.

What is claimed is:

1. A portable machine for facing a surface on a workpiece, the machine being the type which utilizes the workpiece as a foundation during the facing operation and comprises:
    (a) a frame removably connected to the workpiece for supporting the machine on the workpiece,
    (b) an arm having inner and outer ends, the inner end being pivotally supported by the frame, the outer end of the arm being rollably supported by the workpiece,
    (c) a machine head movably mounted on the arm and adapted to drive an incising tool,
    (d) a template mounted on the workpiece and having a surface contour corresponding to the surface contour of the workpiece after facing,
    (e) tracer means operably associated with the machine head and template for moving the machine head to face the workpiece surface in correspondence with the template surface, and
    (f) means for moving the arm during the facing operation.

2. The machine according to claim 1 wherein the frame includes a beam removably mountable on the workpiece and a pedestal disposed centrally of the beam.

3. The machine according to claim 2 further comprising a platform connected to the workpiece, the inner end of the arm pivotally supported by the pedestal, and a roller depending from the outer end of the arm for rollably supporting the outer end on the platform.

4. The machine according to claim 1 wherein the machine head is slidably mounted on the arm for movement toward and away from the workpiece.

5. The machine according to claim 1 wherein the template is mounted adjacent the workpiece such that the template surface and workpiece surface are both disposed in substantially horizontal planes.

6. The machine according to claim 1 wherein the tracer means is a hydraulically actuated tracer unit carried by the arm for moving the machine head relative to the workpiece during the machining operation.

7. The machine according to claim 1 wherein the moving means is a motorized feed mechanism carried by the arm and operably associated with the workpiece for moving the arm relative thereto during the facing operation.

8. The machine according to claim 1 including
    (g) supporting means mounted on the workpiece for supporting the outer end of the arm and template.

9. The machine according to claim 1 wherein the frame includes a pedestal centrally bored to receive a pivot shaft journalled therein for rotation in place, the pivot shaft having an upper end extending above the pedestal for connection to the arm, and the inner end of the arm is pivotally mounted on the upper end of the shaft for rotation thereabout.

10. The machine according to claim 1 wherein the tracer means is a hydraulically actuated tracer unit carried by the arm, and the machine includes a leg depending from the machine head, a tracer valve is carried by the leg and operably associated with the template, a platform is mounted on the workpiece for rollably supporting the outer end of the arm in a substantially horizontal plane, and the tracer valve senses variations in surface configuration vis-a-vis the template and platform for moving the machine head toward and away from the workpiece to face the surface thereof so that it corresponds to the surface of the template.

References Cited

UNITED STATES PATENTS

| | | | |
|---|---|---|---|
| 2,827,836 | 3/1958 | Horth et al. | 90—13 |
| 3,067,651 | 12/1962 | Hogden et al. | 90—12 |
| 3,145,622 | 8/1964 | Rust et al. | 90—13 |
| 3,175,465 | 3/1965 | Fuller et al. | 90—12 |

FOREIGN PATENTS

| | | |
|---|---|---|
| 53,116 | 11/1910 | Switzerland. |
| 691,064 | 5/1953 | Great Britain. |
| 747,964 | 4/1956 | Great Britain. |

GERALD A. DOST, Primary Examiner

U.S. Cl. X.R.

90—13